W. P. DEONIER.
ANTISLIPPING DEVICE FOR VEHICLE WHEELS.
APPLICATION FILED AUG. 21, 1912.
1,056,642.
Patented Mar. 18, 1913.
2 SHEETS—SHEET 1.
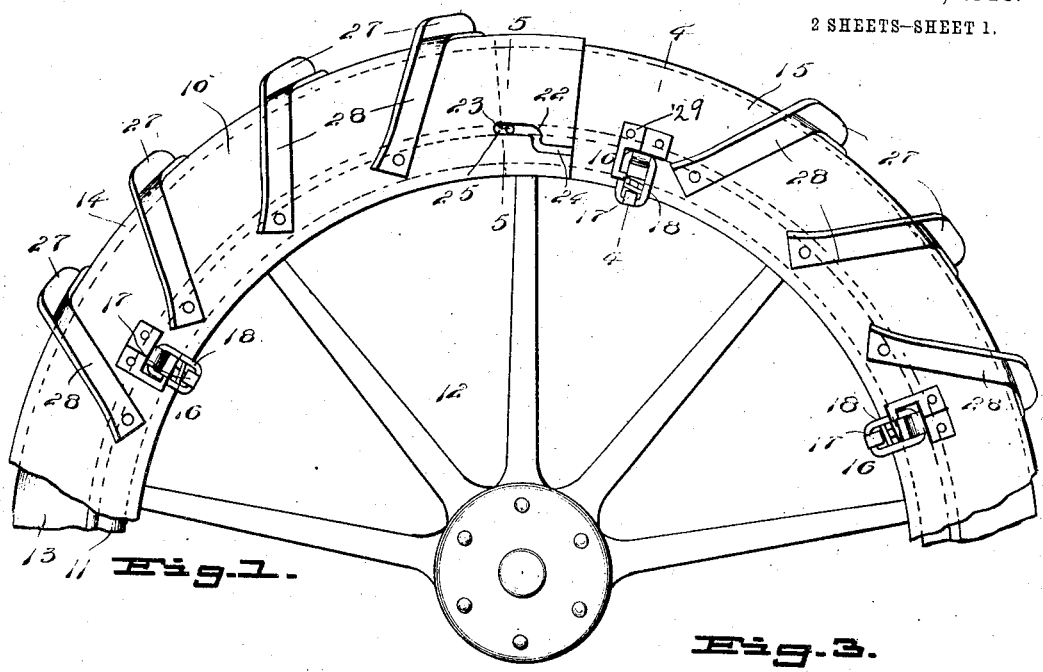
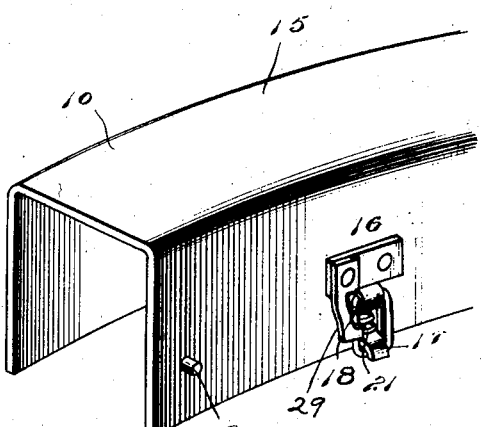
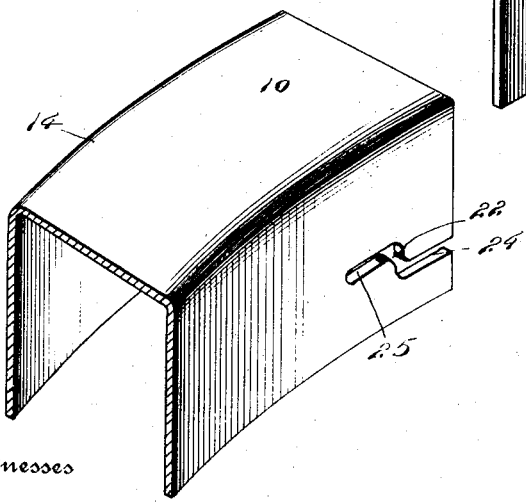
Witnesses
Inventor
William P. Deonier.
By Victor J. Evans
Attorney W. P. DEONIER.
ANTISLIPPING DEVICE FOR VEHICLE WHEELS.
APPLICATION FILED AUG. 21, 1912.
1,056,642.
Patented Mar. 18, 1913.
2 SHEETS—SHEET 2.
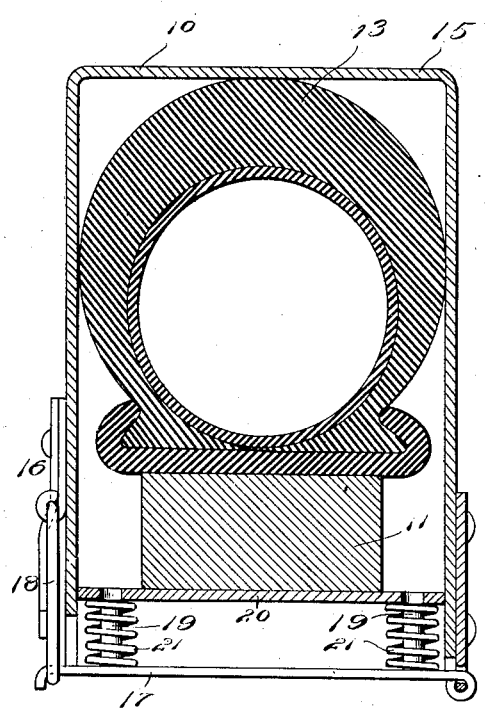
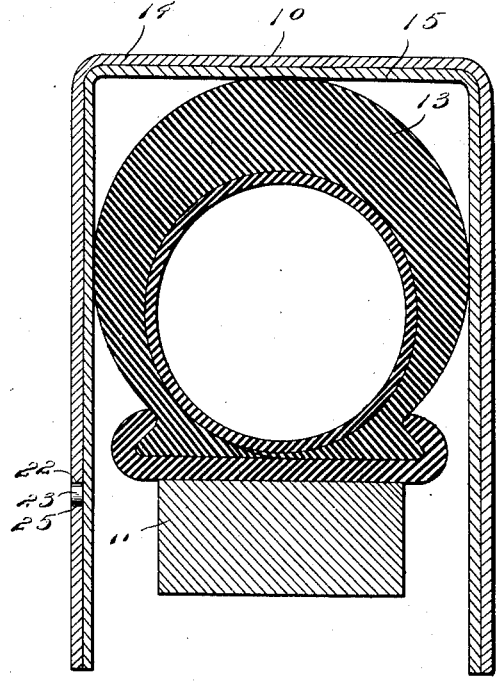
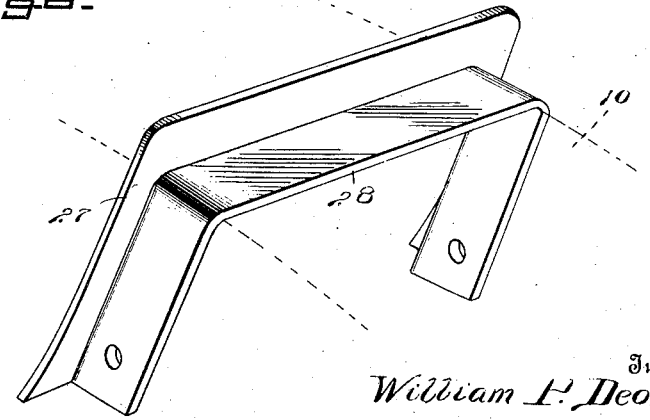
Witnesses
Inventor
William P. Deonier.
By Victor J. Evans
Attorney

UNITED STATES PATENT OFFICE.

WILLIAM P. DEONIER, OF HARRAH, OKLAHOMA.

ANTISLIPPING DEVICE FOR VEHICLE-WHEELS.

1,056,842.  Specification of Letters Patent.  Patented Mar. 18, 1913.

Application filed August 21, 1912. Serial No. 716,245.

*To all whom it may concern:*

Be it known that I, WILLIAM P. DEONIER, a citizen of the United States, residing at Harrah, in the county of Oklahoma and State of Oklahoma, have invented new and useful Improvements in Antislipping Devices for Vehicle-Wheels, of which the following is a specification.

An object of the invention is to provide a device for attachment to a vehicle wheel for preventing the same from slipping relatively to the ground or surface over which the wheel is operated.

The invention embodies, among other features, a device more particularly adapted for use in connection with automobile wheels and which includes a plurality of sections adapted for connection with the wheel to inclose the tire thereof, the sections being relatively interlocked and provided with tread members, adapted to increase the traction between the wheel and the ground, particularly in instances where the wheel is operated over slippery ground or in sand.

In the further disclosure of the invention reference is to be had to the accompanying drawings constituting a part of this specification, in which similar characters of reference denote corresponding parts in all the views, and in which:

Figure 1 is a fragmentary side elevation of a vehicle wheel, showing my device mounted thereon; Fig. 2 is a fragmentary perspective view looking at one end of one section, the same having been removed from the vehicle wheel; Fig. 3 is a fragmentary perspective view of the adjacent end of the next section, the same having been removed from the vehicle wheel; Fig. 4 is a vertical transverse sectional view taken on the line 4—4 in Fig. 1: Fig. 5 is a vertical transverse sectional view taken on the line 5—5 in Fig. 1; and Fig. 6 is a perspective view of one of the treads.

Referring more particularly to the views, I employ a casing 10, for connection with the rim 11 of a vehicle wheel 12, such as an automobile wheel, the said wheel being provided with a pneumatic tire 13. The casing 10 consists substantially of a plurality of sections 14, 15, with the section 14 adapted for interlocking engagement with the section 15, as will be hereinafter more fully disclosed. Adjacent each end of each section is mounted a securing member 16, comprising a plate 17 mounted to swing on one side of the section and having the free end thereof adapted for connection with a strap 18 mounted to swing on the other side of the section, the said plate 17 being adapted to extend transversely to the rim of the vehicle wheel and provided with inwardly extending pins 19, rigidly secured to the plate 17 and extending laterally thereto, a bearing plate 20 being slidably mounted on the pins 19 as shown, an expansible helical spring 21 being mounted to encircle each pin 19 of each plate 17, the said springs being interposed between the plate 17 and the bearing plate 20 to retain the plate 20 in frictional engagement with the rim 11 when the free end of the plate 17 is connected to the strap 18. The sections 14, 15 are preferably U-shaped in cross section, and when mounted to inclose the tire 13 are adapted to be held rigidly to the rim 11 of the vehicle wheel 12 by the securing members 16, in the manner mentioned above, it being readily seen that the expansibility of the springs 21 will hold the bearing plate 20 against the rim 11 and also cushion the sections 14, 15 relatively to the vehicle wheel.

Bayonet slots 22 are provided in the sides of the section 14 adjacent the end thereof and are adapted to slidably receive therethrough laterally extending pins 23, secured to the sides of the section 15, adjacent the end thereof, the said bayonet slots being formed so that when the sections 14, 15 are initially placed upon the vehicle wheel 12, the pins 23 will extend into the forward portions 24 of the bayonet slots and will then be moved to lie in the plane of the vertical portions 25 of the bayonet slots. Now when the securing members 16 are moved into securing position in the manner mentioned above, it will be readily seen that the sections 14, 15 will be moved toward the rim 11 of the vehicle wheel, thus causing the pins 23 to move upwardly in the vertical portions of the bayonet slots 22 and lie in the rear portions of the bayonet slots so that if the tire 13 should deflate, the weight of the vehicle on the vehicle wheel will not collapse or injure the sections 14, 15, it being readily seen that the section 14 will ride or overlap the section 15 in view of the pin and slot connection between the sections 14, 15, it being further seen that by simply releasing the securing members 16, the sections 14, 15 can be readily disengaged, the pins 23 of the section 15 being moved out of the bayonet slots 22 of the section 14. It will be further seen that by connecting the sections 14, 15 in the manner mentioned, an end of one section will overlap an end of the next adjacent section, thus forming a joint which will prevent small stones and the like from entering the casing 10 and becoming wedged between the casing and the tire 13.

A series of treads 27 are formed with or secured to the casing 10, the mentioned treads being arranged in spaced relation on the sections 14, 15 and extending across the outer faces thereof, each tread 27 consisting substantially of an angle bar 28 having one portion thereof resting upon the face of the casing and the other portion thereof extending diametrically outwardly from the casing, the said angle bar being bent in a U-shaped form so that the ends thereof will overlap the sides of the casing, said overlapping ends being bolted or riveted to the casing to secure the tread 27 in rigid position on the casing.

In the use of my device in connection with automobile wheels or other vehicle wheels, the sections 14, 15 can be readily connected to the wheel prior to advancing the vehicle over a slippery roadway or a sandy road, it being readily seen that with the use of the device described, the tractional effect of the vehicle wheel will be greatly increased, thus preventing any slipping of the vehicle when the vehicle is advanced over a sandy or a slippery road, as mentioned heretofore.

When the sections 14, 15 have been removed from the vehicle wheel, the mentioned sections can be conveniently arranged in relatively adjacent position and conveniently secured to the vehicle without in any manner hampering the proper operation of the vehicle, it being readily seen that if the sections were permanently connected, the same would form a bulky package and could not be conveniently secured to the automobile or other vehicle when not in use, whereas by making the casing 10 in sections the same can be easily strapped to the vehicle.

In order to lock the strap 18 in engagement with the plate 17, an L-shaped locking member 29 is mounted to swing on each section 15 and movable to extend across a portion of the strap, thus retaining the same in engagement with the plate 17 as shown in Fig. 3.

Having thus described my invention, I claim:

A device of the class described comprising a casing consisting of a plurality of connectible sections adapted to inclose the rim of a vehicle wheel, a securing member mounted on each end of each section, said securing member consisting of a plate mounted to swing on one side of the section, a strap mounted to swing on the other side of the section and adapted to be engaged by the free end of the said plate, pins extended laterally from the said plate, a bearing plate mounted to slide on the said pins and adapted to engage the rim of the vehicle wheel, and expansible helical springs mounted to encircle the said pins and interposed between the said plate and the said bearing plate to retain the inner face of the said bearing plate in frictional contact with the rim of the vehicle wheel.

In testimony whereof I affix my signature in presence of two witnesses.

WILLIAM P. DEONIER.

Witnesses:
R. C. KAYLER,
E. KIRBY.

Copies of this patent may be obtained for five cents each, by addressing the "Commissioner of Patents, Washington, D. C."